(12) United States Patent
Konanur et al.

(10) Patent No.: US 12,444,833 B2
(45) Date of Patent: Oct. 14, 2025

(54) MULTI-BAND ANTENNA

(71) Applicant: Tesla, Inc., Austin, TX (US)

(72) Inventors: Anand S. Konanur, San Jose, CA (US); Shreya Singh, La Jolla, CA (US); Richard Breden, Mountain View, CA (US); Yasutaka Horiki, Santa Clara, CA (US); Aycan Erentok, Mountain View, CA (US); George Zucker, San Francisco, CA (US); Nagarjun Bhat, Sunnyvale, CA (US); Rui Moreira, San Jose, CA (US); Aydin Nabovati, Toronto (CA); Rishabh Bhandari, San Carlos, CA (US); Austin Rothschild, Palo Alto, CA (US); Jae Hoon Yoo, San Jose, CA (US); Loic Le Toumelin, Palo Alto, CA (US)

(73) Assignee: Tesla, Inc., Austin, TX (US)

( * ) Notice: Subject to any disclaimer, the term of this patent is extended or adjusted under 35 U.S.C. 154(b) by 78 days.

(21) Appl. No.: 18/259,764

(22) PCT Filed: Jan. 19, 2022

(86) PCT No.: PCT/US2022/012965
§ 371 (c)(1),
(2) Date: Jun. 28, 2023

(87) PCT Pub. No.: WO2022/159481
PCT Pub. Date: Jul. 28, 2022

(65) Prior Publication Data
US 2024/0088547 A1   Mar. 14, 2024

Related U.S. Application Data

(60) Provisional application No. 63/139,189, filed on Jan. 19, 2021.

(51) Int. Cl.
*H01Q 1/36* (2006.01)
*B60R 1/12* (2006.01)
(Continued)

(52) U.S. Cl.
CPC ............. *H01Q 1/3266* (2013.01); *B60R 1/12* (2013.01); *H01Q 1/02* (2013.01); *H01Q 13/106* (2013.01);
(Continued)

(58) Field of Classification Search
CPC ...... H01Q 1/3266; H01Q 1/02; H01Q 1/1278; H01Q 1/36; H01Q 13/106; H01Q 15/14;
(Continued)

(56) References Cited

U.S. PATENT DOCUMENTS

| 2002/0011965 | A1 | 1/2002 | Kunysz et al. | |
| 2004/0056822 | A1* | 3/2004 | McCarthy | H01Q 21/26 343/895 |

(Continued)

OTHER PUBLICATIONS

Shepov et al., "Few-element active antenna arrays for high-accuracy anti-jamming GLONASS/GPS receivers," Oct. 14, 2015, 12th International Conference on Telecommunication in Modern Satellite Cable and Broadcasting Services (TELSIKS), IEEE, pp. 176-179.

(Continued)

*Primary Examiner* — Awat M Salih
(74) *Attorney, Agent, or Firm* — Knobbe, Martens, Olson & Bear, LLP

(57) ABSTRACT

A multi-band antenna system is provided. The antenna system can be placed under and embedded within a glass exterior surface of a vehicle. Such an antenna system can include a capacitively coupled metallic element on or adjacent to the glass exterior surface, which can serve as both a parasitic element to enhance gain and as a heating element to melt snow and/or ice accumulation over the glass area that (Continued)

covers the antenna. In certain applications, the antenna's structure itself can be used as a heater to improve performance in adverse weather conditions while the heating elements are positioned away from the thermally sensitive electronics. The antenna system with integrated heating can include a spiral antenna.

20 Claims, 16 Drawing Sheets

(51) Int. Cl.
    *H01Q 1/02*     (2006.01)
    *H01Q 1/32*     (2006.01)
    *H01Q 13/10*     (2006.01)
    *H01Q 15/14*     (2006.01)

(52) U.S. Cl.
    CPC ...... *H01Q 15/14* (2013.01); *B60R 2001/1261* (2013.01)

(58) Field of Classification Search
    CPC ...... H01Q 15/008; H01Q 21/064; H01Q 9/27; H01Q 11/08; B60R 1/12; B60R 2001/1261
    See application file for complete search history.

(56) References Cited

U.S. PATENT DOCUMENTS

| | | |
|---|---|---|
| 2007/0018899 A1 | 1/2007 | Kunysz et al. |
| 2010/0026590 A1 | 2/2010 | Chiang et al. |
| 2019/0207317 A1* | 7/2019 | Hong ..................... H01Q 5/357 |
| 2020/0161776 A1* | 5/2020 | McMahon ............ H01Q 1/523 |

OTHER PUBLICATIONS

International Search Report and Written Opinion dated May 2, 2022 in application No. PCT/US2022/012965.

\* cited by examiner

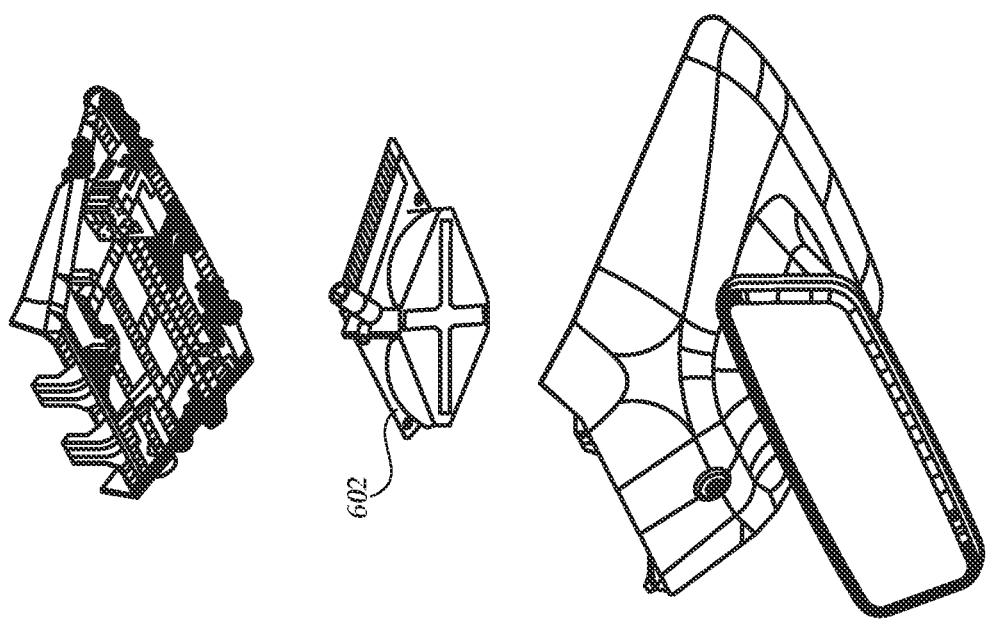

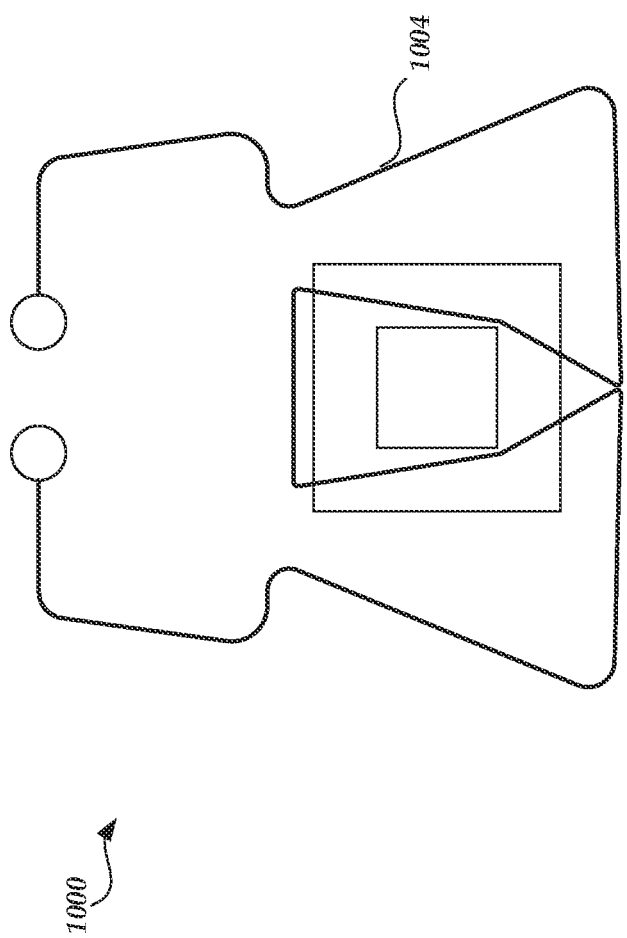

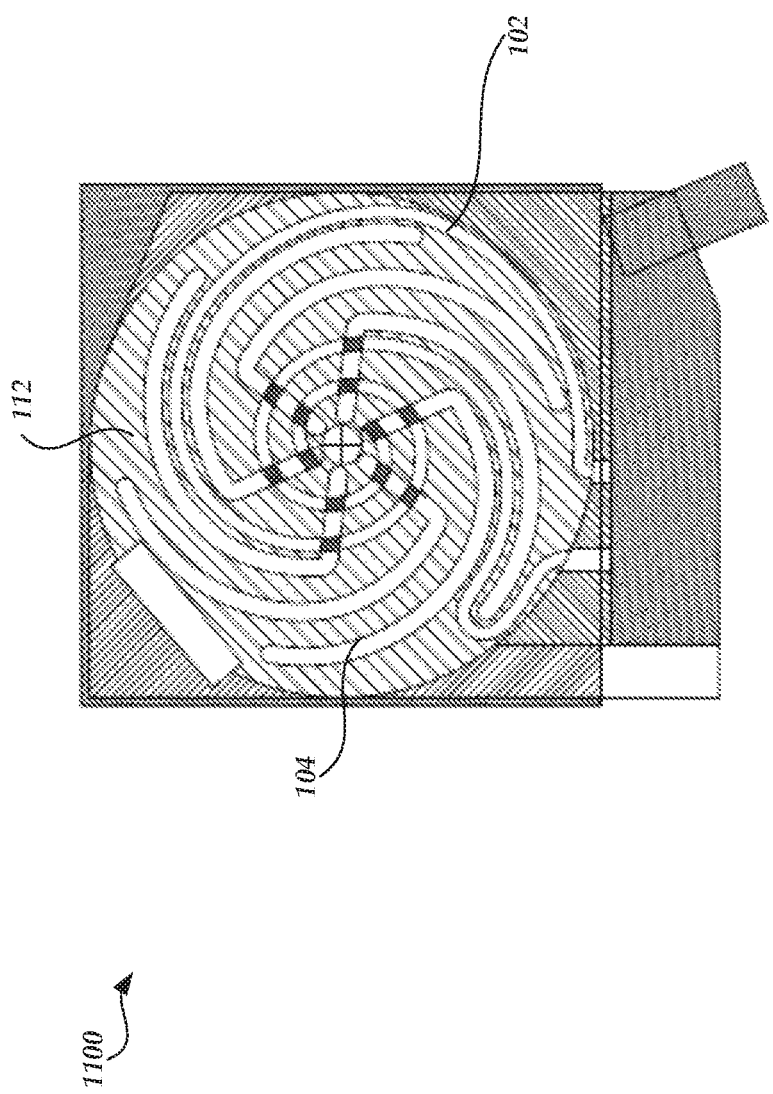

MULTI-BAND ANTENNA

CROSS REFERENCE TO PRIORITY APPLICATIONS

This application is a U.S. national phase application under 35 U.S.C. § 371 of International Application No. PCT/US2022/012965, titled "MULTI-BAND ANTENNA," and filed on Jan. 19, 2022, which claims priority to U.S. Provisional. Application No. 63/139,189, titled "MULTI-BAND ANTENNA AND/OR ANTENNA WITH SURFACE HEATING," and filed on Jan. 19, 2021, the disclosures of each of which are hereby incorporated herein by reference in their entireties and for all purposes.

BACKGROUND

Technical Field

Embodiments of this disclosure relate to antennas and antenna systems.

Description of Related Art

Global Navigation Satellite System (GNSS) technology involves antennas that can receive signals from satellites in the earth's atmosphere. GNSS antenna systems can be useful for providing Global Positioning System (G-PS) signals and/or other signals in a variety of contexts. GNSS antennas can receive signals at multiple frequencies when there is a desire to enhance positional accuracy. Multi-band signal reception can present technical challenges associated with configuring the antenna for receiving signals at more than one band. GNSS antennas can function more effectively when they are free from occlusions.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

FIGS. A and 1B depict an illustrative antenna system according to one or more aspects of the present application;

FIGS. 6A, 6B, and 6C depict an illustrative antenna system embedded in vehicle equipment according to one or more aspects of the present application;

FIG. 10 depicts an illustrative antenna system and heating system according to one or more aspects of the present application; and FIG. 11 depicts an illustrative antenna system according to one or more aspects of the present application;

DETAILED DESCRIPTION OF EMBODIMENTS

Figure 1B:
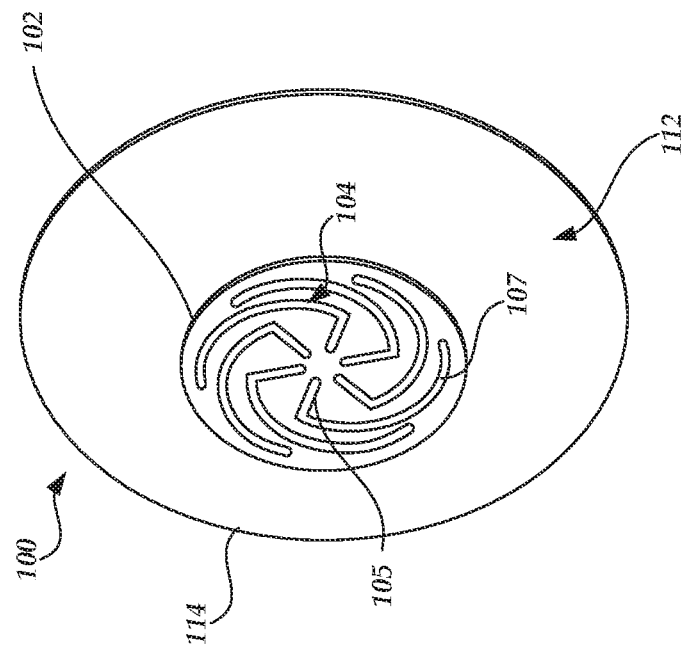

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Global Navigation Satellite System (GNSS) technology involves antennas that can receive signals from satellites in the earth's atmosphere. GNSS system antennas benefit from reception of signals at multiple frequencies when there is a desire to enhance positional accuracy. GNSS antennas that can receive satellite signals from L1 (1559 MHz to 1610 MHz), L2 (1215 MHz to 1254 MHz), and L5 (1164 MHz to 1214 MHz) bands provide the ability to perform in situ corrections for atmospheric errors. In addition, GNSS antennas enable ambiguity resolution in carrier phase based GNSS algorithms, enabling enhanced standalone performance. Multi-band antenna accuracy remains higher than single frequency solutions when both are provided with the same quality corrections. Such antennas also help in rejecting multipath signals that tend to deteriorate single band antenna performance.

GNSS antenna systems can be useful for providing Global Positioning System (GPS) signals and/or other signals to vehicle systems for different functions involving accurate location information. For example, signals received from a GNSS antenna can be combined with data from other sensors (e.g., ultrasonic sensors and/or cameras) to plan a route to take a vehicle to a target location, such as summoning the vehicle to the owner or another person. GNSS antenna systems can also be useful for other features that involve precise or general location information such as navigation, autopilot and other self-driving features, searching for nearby gas stations, restaurants, or businesses. GNSS antenna systems can also be useful for relaying precise or general location information for relaying pertinent information regarding the region and local advertisements.

Certain multi-band GNSS antennas have involved using stacked patch antennas or helix antennas. Such multi-band antennas can have complex feed structures designed to enhance Right Hand Circular Polarized Gain and suppress Left Hand Circular Polarized Gain to thereby improve performance. Such multi-band antennas tend to be thick in size or limited to a narrower band, which can cause a degradation in performance. These features of certain multi-band antennas can diminish the desirability of such multi-band antennas for automotive usage where antennas are integrated within the envelope of the vehicle surface.

Aspects of this disclosure relate to multi-band antenna systems, such as system including GNSS antennas. The antenna can be illustratively designed for use or integrated in a vehicle. Such an antenna can include a plurality of slots and a plurality of spiral feeds. The slots and the spiral feeds can be on opposing sides of a circuit board or other substrate. The antenna includes a reflector to reflect antenna radiation to an upper hemisphere. The reflector can be spaced apart from the circuit board by less than a quarter wavelength, and the reflector can reflect radiation in phase. In certain instances, a thickness of the antenna system can be 15 millimeters or less. The antenna can be embedded into the same surface as the reflector. This reflector can increase antenna gain while enabling the antenna to be relatively thin. The reflector can be an artificial magnetic ground plane in certain embodiments. The reflector can be a metallized surface of a vehicle (e.g., an interior surface visible to a vehicle occupant) in some other embodiments. The antenna can be included in an active antenna system that also includes a low noise amplifier. The antenna can be included in a housing that also includes other circuit elements. Different spiral feeds of the antenna can be connected to different respective ports of a diplexer that is coupled between the antenna and the low noise amplifier.

Aspects of this disclosure relate to an antenna system with integrated heating. The antenna system can maintain antenna functionality under adverse weather conditions, such as when there is snow and/or ice on a surface over the antenna. The antenna system can be designed for a vehicle. The antenna system can include a multi-band antenna, such as a GLASS antenna. The antenna system can be placed under and embedded within a glass exterior surface of a vehicle. Such an antenna system can include a capacitively coupled metallic element on or adjacent to the glass exterior surface, which can serve as both a parasitic element to enhance gain and as a heating element to melt snow and/or ice accumulation over the glass area that covers the antenna. In certain applications, the antenna's structure itself can be used as a heater to improve performance in adverse weather conditions while the heating elements are positioned away from the thermally sensitive electronics. The antenna system with integrated heating can include a spiral antenna with any suitable combination of features disclosed herein. In some other applications, different antennas can be used with integrated heating to remove snow and/or ice from a vehicle surface.

Example embodiments of antennas will now be discussed. Any suitable principles and advantages of these antennas can be combined with each other as suitable.

Figure 1A:
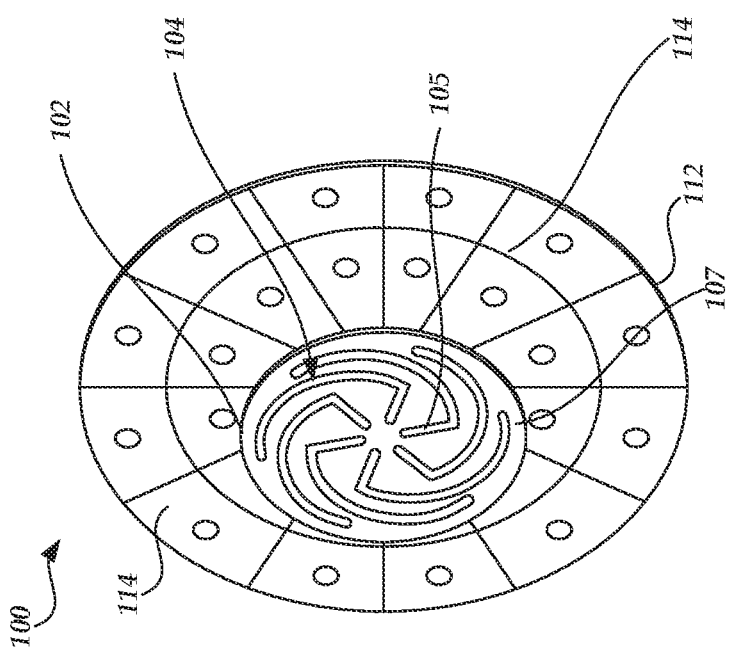

FIG. 1A illustrates an embodiment of an antenna system 100. The antenna system 100 can include an antenna component embodied as a printed circuit board (PCB) 102 that includes plurality of slots 104 for receiving radio signals. Illustratively, the plurality of slots can include a variety of slots, illustratively illustrated as a set of 6 or more slots. The slots 104 can be etched into the top layer of the PCB 102 to form the antenna component of the antenna system 100. Illustratively, the PCB 102 can include a top layer 106 and a bottom layer 108. The plurality of slots 104 (e.g., antenna slots) can spiral around the top layer or top surface of the PCB 102. Illustratively, each individual slot can include a first portion 105 that are configured to be placed on the first surface 106 in an equidistant manner. Individual slots can further include a second portion 107 that organized to radially spiral around a center portion of the antenna component 102 (e.g., the center of the PCB). The bottom layer 108 of the PCB (not shown) may include a pair of spiral feeds 110 arranged to connect to the slots 104 on the top layer of the PCB 102. The two spiral feeds 110 on the bottom layer of the PCB 102 can maintain the symmetry of the design. Illustratively, embodiments of a symmetrical design of the spiral feeds 110 allows each of the spiral feeds 110 to be fed separately, creating a two-feed antenna system 100. This allows for a low noise amplifier topology with fewer parts, thus reducing cost of the overall system. An example of a system with such a low noise amplifier will be discussed with reference to FIG. 5. The antenna slots 104, PCB 102, and antenna feeds 110 can together have an overall thickness in a range from about 0.5 millimeters to about 3 millimeters in certain applications, including any value defined within the range.

In FIG. 1A, the antenna system 100 includes an Artificial Magnetic Conductor (AMC) 112 ground plane that serves as a reflector. An AMC can be a surface that reflects signals impinging on it. The AMC 112 can reflect signals in-phase with the source. By reflecting the signals in-phase with the source, the AMC 112 can be placed closer to the antenna than a quarter wavelength. The AMC 112 can enhance the gain of the signal by increasing the average upper hemisphere gain of a signal being received by the antenna. This increase in average upper hemisphere gain can be a result of reflecting energy from the AMC. In some embodiments, the AMC 112 may be omitted from the antenna system 110 in favor of other reflective surfaces.

As illustrated in FIG. 1A, the AMC 112 can include of a series of radially symmetric patches 114, each grounded to the solid copper layer below through a via. These radially symmetric patches can be designed to have an area that creates a band gap close to two different frequency bands, such as the L2/L5 bands. Accordingly, the surface of each radially symmetric patch can be excited so as to reflect the targeted frequencies and signals back in phase, increasing gain for that signal. This reflection can boost upper hemisphere gain. Other frequencies may not be reflected because the signal is propagated along the surface of each radially symmetric patch. The AMC 112 can also retain the radial symmetry of the overall antenna. FIG. 1B illustrates an antenna similar to the antenna of FIG. 1A, except that the antenna of FIG. 1B includes a metal disk in place of the AMC 112. The metal disk 114 can be referred to in some embodiments as a perfect electric conductor.

Figure 2A:
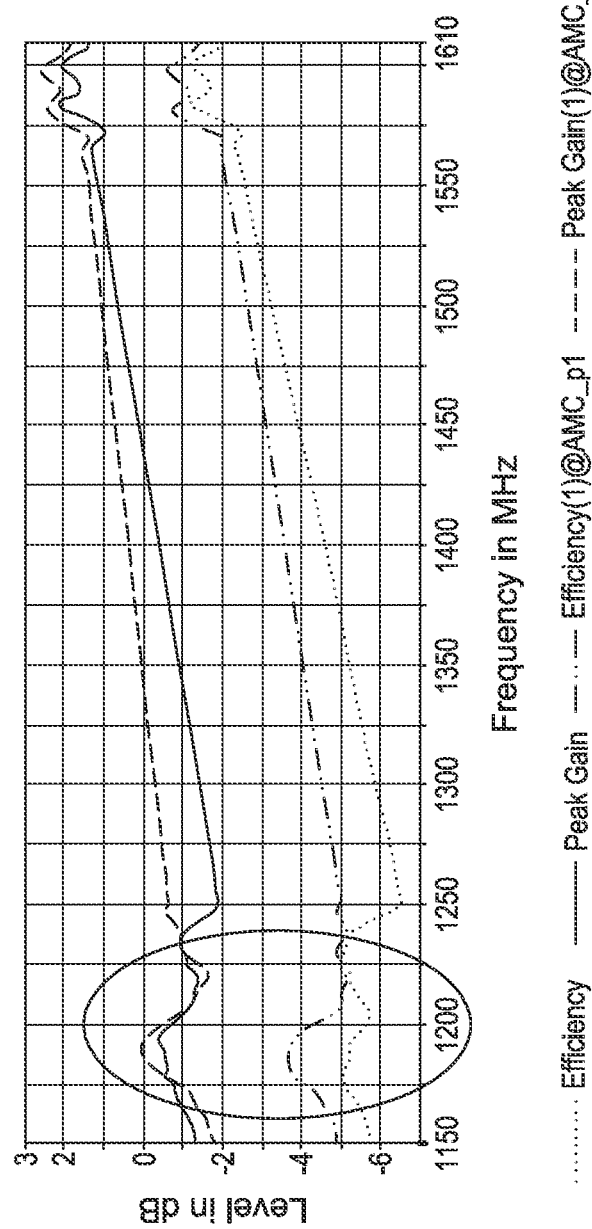
FIGS. 2A and 2B are charts illustrative of comparing antenna gain performance of two ports of antennas according to one or more aspects of the present application.
Figure 2B:
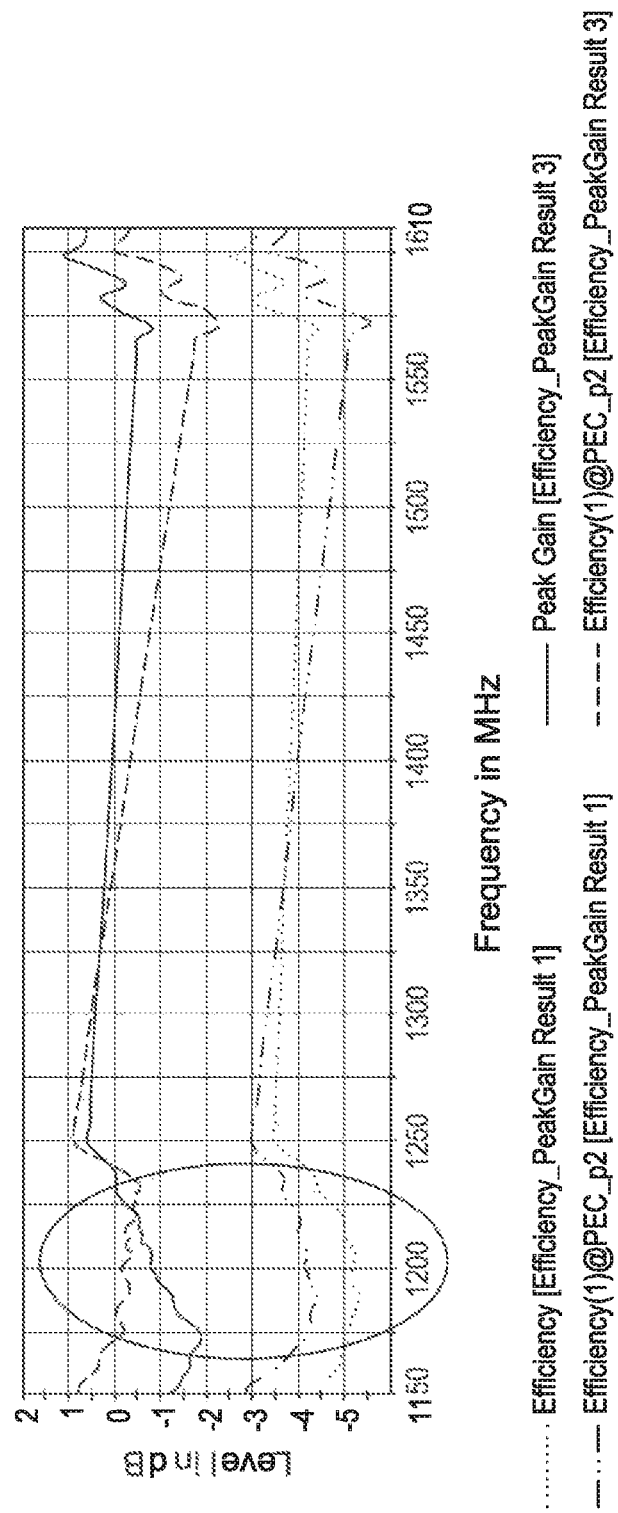

FIGS. 2A and 2B are graphs comparing antenna gain performance of two ports of antennas in FIGS. 1A and 1B, respectively. FIG. 2A indicates that the antenna of FIG. 1A has a second band of operation around 1.15 GHz to 1.25 GHz that is not achieved by the antenna of FIG. 1B as seen in the graph of FIG. 2B. The appearance of this second resonance band in a low-profile antenna can be attributed to the AMC as a surface that reflects signals incident on it with a zero-degree phase change. Accordingly, FIGS. 2A and 2B indicate that the antenna of FIG. 1A can have an additional band of operation relative to the antenna of FIG. 1B.

This multi-band antenna design is useful for receiving signals from a GNSS satellite. This multi-band antenna can include a simple feed structure designed to enhance Right Hand Circular Polarized Gain and suppress Left Hand Circular Polarized Gain to thereby improve performance. Accordingly, the antennas according to embodiments can maintain a low profile while operating on a relatively wide band of frequencies for high performance, Such an antenna can be used in a vehicle which has strict design criteria, such as the specification that the antenna be integrated within an envelope of the vehicle's exterior surface.

Figure 3A:
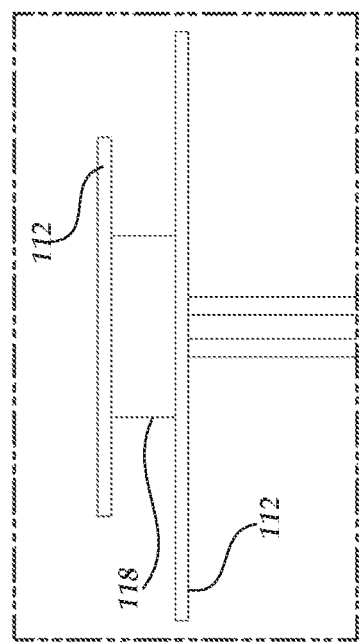
FIGS. 3A-3C depict an illustrative antenna system according to one or more aspects of the present application.
Figure 3C:
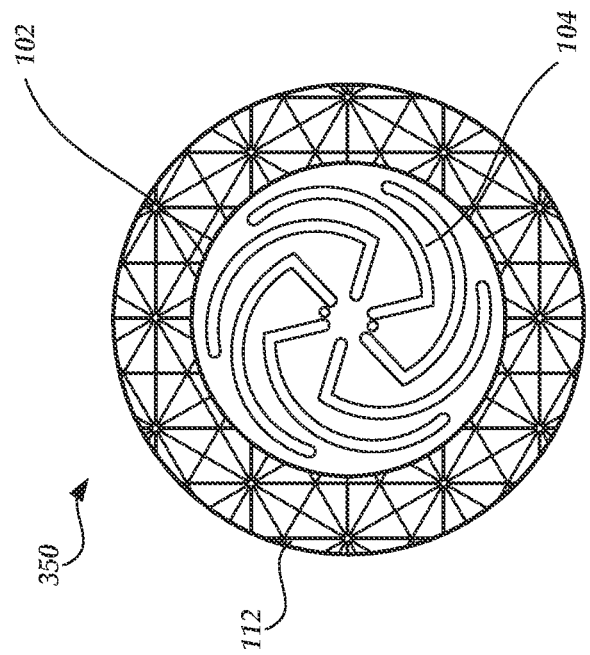
Figure 3B:
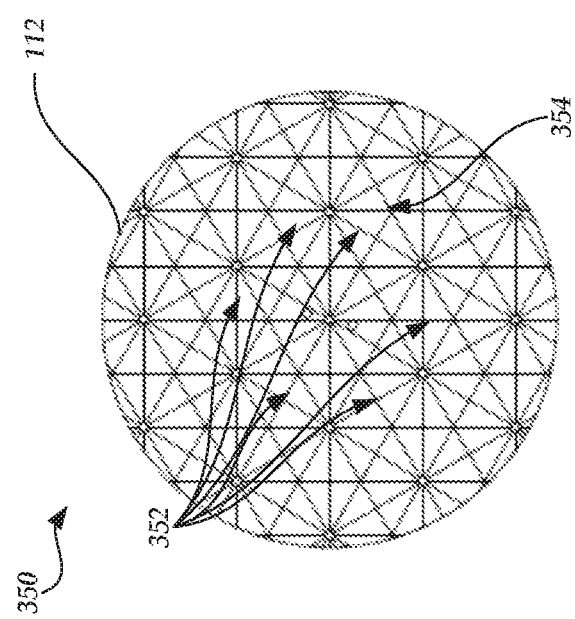

Reference to FIGS. 3A-3C includes reference to one or more of the components previously discussed with regard to FIG. 1A. FIG. 3A illustrates an embodiment of an antenna system 300 having specific configurations of illustrative components. A spacer 118 is placed between the antenna component 102 and the ground plane for separation 112. The spacer 118 may prevent and/or decrease the possibility of short-circuiting between the feeds of the antenna component 102 and the ground plane 112. The spacer can be 3D printed or made of any suitable insulating and/or non-conductive material.

With reference to FIG. 3B, an embodiment includes an AMC surface 350 comprising hexagonal unit cells 352. FIG. 3B illustrates the edges of an individual hexagonal unit cell 352. The ground plane 112 in FIG. 3A can be the AMC surface 350 of FIG. 3B. These hexagonal cells 352 are segmented into triangular sub-cells 354. FIG. 3B illustrates a center of a single triangular sub-cell 354. The hexagonal cells 352 and triangular sub-cells 354 reflect the targeted frequencies and signals hack in phase, increasing gain for that signal. The hexagonal cells 352 and triangular sub-cells 354 can increase upper hemisphere gain by reflecting energy from the lower hemisphere. In some other embodiments, the triangular sub-cells 352 can correspond to identically shaped or substantially identically shaped, regular polygon cells can be used across the AMC surface 350 for simple and precise analysis of antenna response.

In one embodiment, these sub-cells 354 maintain radial symmetry for each individual hexagonal unit cells 352. In another embodiment, these sub-cells 354 maintain radial symmetry for the overall surface of the AMC 350. In another embodiment, the area of each sub-cell 352 is determined by calculating the eigen modes supported by an infinitely large structure consisting of repeated polygonal units.

FIG. 3B depicts an embodiment of a hexagonal unit cell-based AMC 350 before mounting the dual band spiral antenna. FIG. 3C depicts an embodiment of an antenna system 370 including a hexagonal unit cell-based AMC after mounting the dual band spiral antenna component, such as the antenna component depicted in FIG. 1A. Specifically, FIG. 3C is an example top view of the antenna system of FIG. 3A. As previously described, the antenna component (e.g., the spiral slots or spiral antennas) can be separated from the AMC surfaces by a spacer 118 to prevent short-circuiting between the feed spirals on the bottom layer of the antenna component 102 and the cells 352 and/or sub-cells 354 on the top surface 350 of the AMC surface PCB.

Figure 4B:
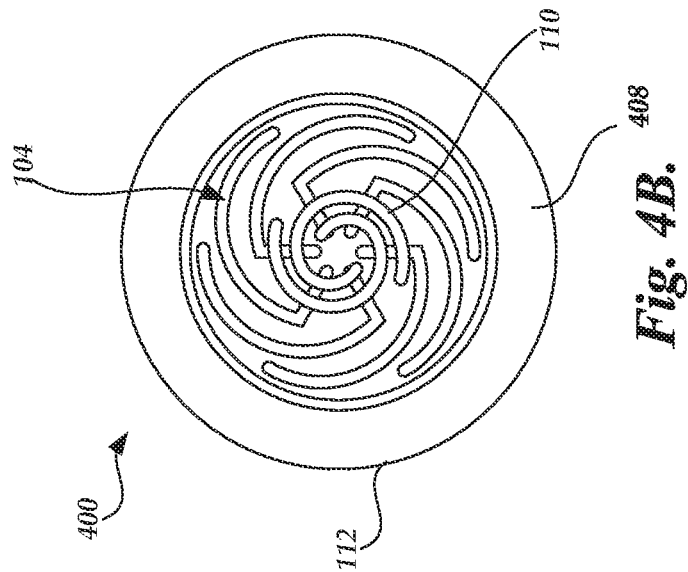
FIGS. 4A and 4B depict an illustrative antenna system according to one or more aspects of the present application.
Figure 4A:
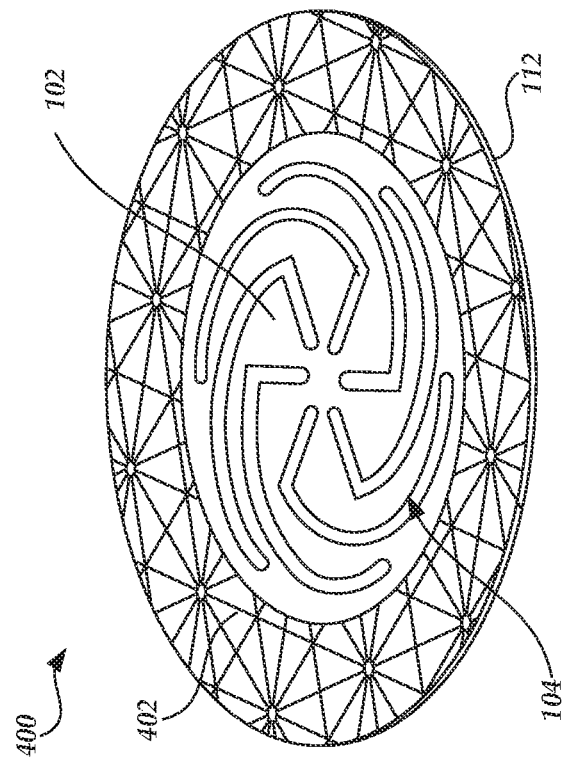

Reference to FIGS. 4A-4B includes reference to one or more of the components previously discussed with regard to FIG. 1A. With reference to FIG. 4A, in an embodiment of an antenna system 400, the antenna component 102 is embedded inside an AMC surface 402, such that the antenna system corresponds to a single layer (or substantially single layer). In this way, the AMC surface 402 frames the antenna component 102 (e.g., the spiral antenna). This can result in a low-profile design that is one PCB thick that maintains good multi-band performance for the antenna. The AMC surface 402 can function similar to as described above with regard to FIG. 3.

FIG. 4B shows the bottom view 406 of an embodiment of an antenna system, such as the antenna system 400 of FIG. 4A. In this embodiment, a bottom PCB layer 406 can include the spiral feeds 408. As previously disclosed, the spiral feeds 408 can connect to the antenna component 102.

Figure 5:
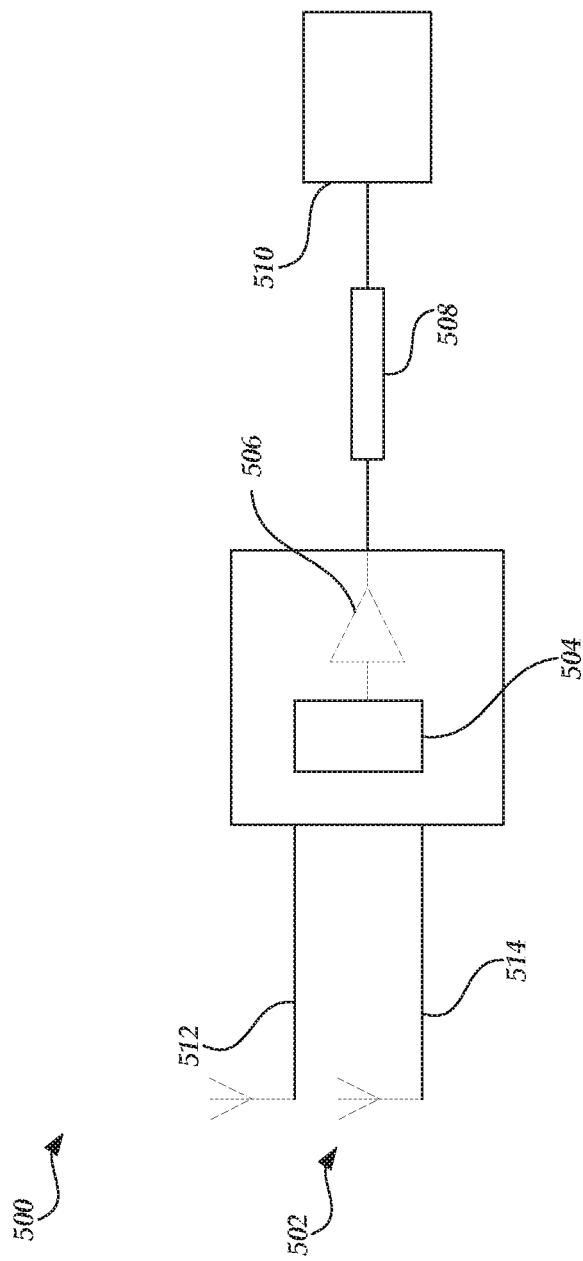
FIG. 5 depict an illustrative antenna system according to one or more aspects of the present application.

FIG. 5 illustrates a block diagram 500 of embodiments of an active antenna system, such as the various embodiments of an active antenna system illustrated in FIGS. 1-4. The antenna system 500 comprises an antenna 502, a diplexer 504, a low noise amplifier 506, a cable 508, and a receiver system 510. The antenna system 500 further includes a first feed 512 and a second feed 514. The first feed 512 and second feed 514 can be spiral feeds that connect illustratively to the antenna component 502. The system of FIG. 5 is an example system in which any suitable antenna component 502 disclosed herein can be implemented.

The first feed 512 and second feed 514 from the antenna provide signals to the low noise amplifier 506 via the diplexer 04. These GNSS signals may originate from satellites, other orbital platforms, or from terrestrial signal sources. Additionally, the GNSS system signals can be signals that originate from another source which are then relayed through satellites, other orbital platforms, or from terrestrial signals to the antenna. Having a first feed and a second feed allows for separate filtering of different frequency bands and/or rejecting multipath signals that tend to deteriorate single band antenna performance.

The first feed 512 and the second feed 514 are connected to different respective ports of the diplexer 504. The diplexer 504 provides separate filtering for different GNSS frequency bands. The diplexer 504 also combines filtered signals associated with GNSS frequency bands. These frequency bands can include L1, L2, or L5 bands. For example, in one embodiment, the first feed 512 can be tuned to the L1 frequency band while the second feed can be tuned to the L2 frequency band. In another embodiment, the second feed 514 can be tuned to the L5 band. Alternatively, the first feed 512 can be tuned to the L2 band. Tuning the feeds to different frequency bands can be used to reject multipath signals that typically deteriorate single band antenna performance. The L1 band may include the range of frequencies from 1559 MHz to 1610 MHz. The L2 band may include frequencies from 1215 MHz to 1254 MHz. The L5 band may include frequencies from 1164 MHz to 1214 MHz. In this way, the diplexer 504 can filter signals from the first feed 512 and the second feed 514 and can combine the signals at a single port that is electrically connected to the low noise amplifier 506.

The combined signal can then be amplified by a low noise amplifier to increase the gain of signals sent by the GNSS system to the antenna system. In some embodiments, there can be a second or multiple additional stages of the low noise amplifier. The system of FIG. 5 can be referred to as an active antenna system because it includes the antenna and the low noise amplifier. Once the gain of the signal has been increased and amplified, the amplified signal can then be output to a receiver system via the cable.

Figure 6A:
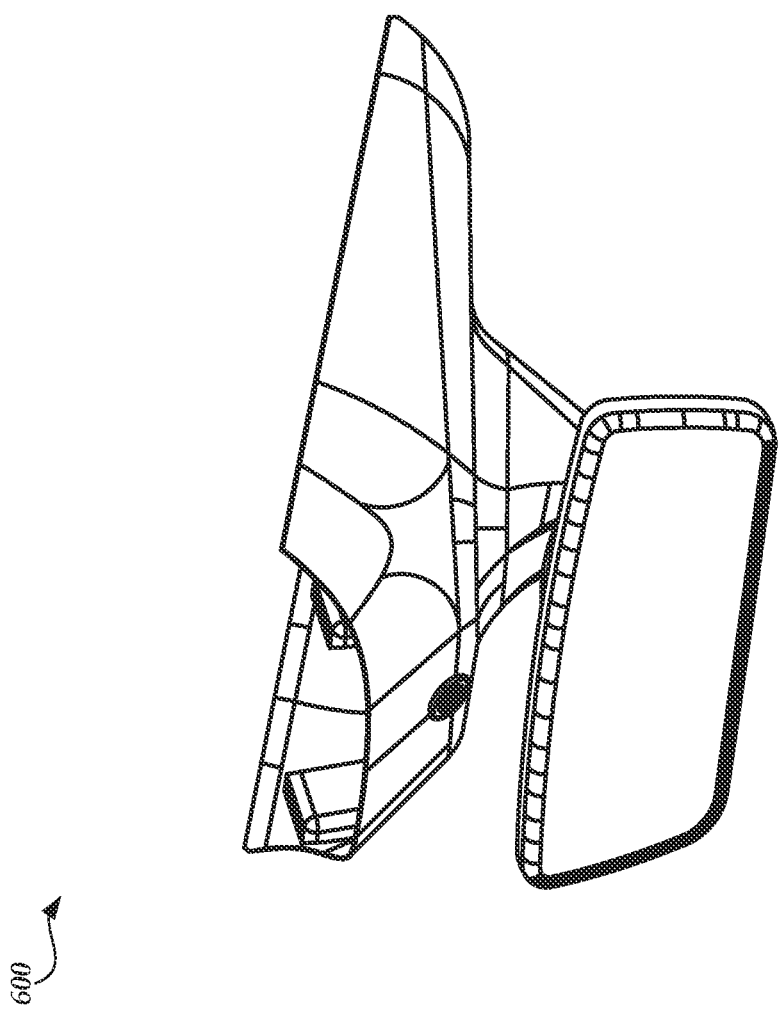

FIG. 6A illustrates an embodiment 600 where the reflector for an antenna system is an interior surface of a vehicle. In some vehicle designs, there may not be space available to integrate an antenna component (e.g., antenna component 102) and a separate ground plate (e.g., reflector 112) to reflect energy from the bottom hemisphere to the upper hemisphere. Similarly, in some vehicle designs there may not be space available to have a single PCB layer antenna framed by an AMC. In such vehicles, an interior surface (e.g., an interior plane) can serve as a reflector for the antenna. An interior surface can include any plane of material that is visible to the vehicle occupant or any plane that is located inside the vehicle in relation to an exterior of the vehicle. The AMC can coat an inner surface of a vehicle in certain applications. An existing surface of a vehicle can be used for multiple purposes such as an AMC or ground plane in addition to for a different purpose.

The interior surface is configured to be a reflector to provide increased gain for the antenna. For example, the interior surface could be metal or include a metallic material. Alternatively, the face of the interior surface directed toward the exterior of the vehicle, referred to hereafter as the interior face, can be metallized. The interior face could be a metallized plastic, another metallized material, or a combination of metal, metallic materials, metallized plastics, or other metallized materials. The interior face or metal interior surface can be shaped to reflect targeted signals to increase gain. The interior face or metal interior surface can include cells, sub-cells, or patches to reflect particular signals. In some embodiments, the interior face or metal interior surface can be positioned at one quarter wavelength of the targeted frequencies from the antenna to ensure that the targeted signals are reflect in phase. The interior surface or interior face does not have to be flat but can be curved or otherwise configured.

Figure 6C:
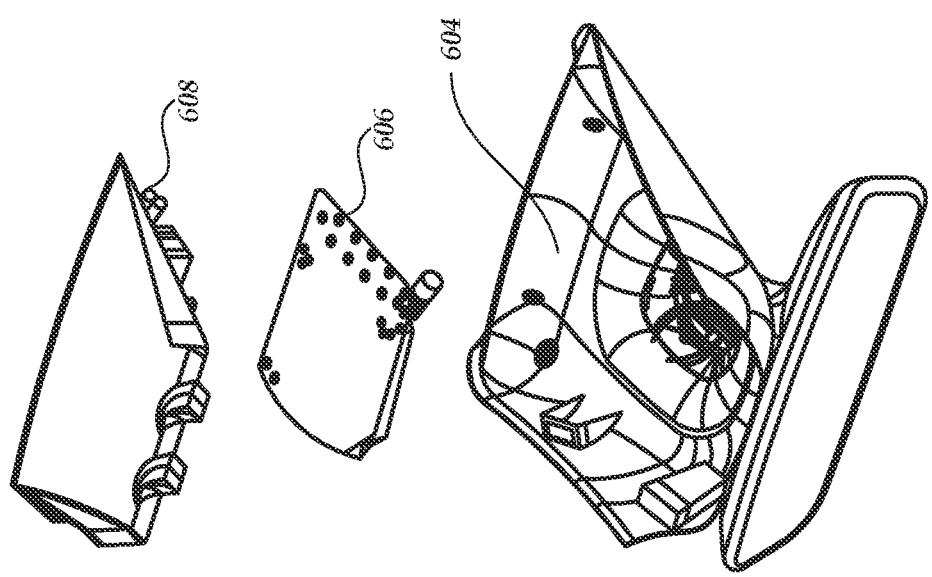

In some embodiments, the antenna system, which includes the antenna and reflector, can be located in an enclosure under the windshield of a vehicle such that the enclosure as seen in FIGS. 6B and 6C. As illustrated, the enclosure provides the interior face 604 as a reflector for the antenna 606. The interior face of a beauty cover can be metallized as shown in FIG. 6B. A bottom view of the antenna with the beauty cover 608 removed is shown in FIG. 6C.

Antenna systems in accordance with any suitable principles and advantages disclosed herein can be located in a variety of different positions of a vehicle. In some embodiments, the antenna system can be located in the rear-view mirror assembly of a vehicle as shown in FIGS. 6A-6C. In some other embodiments, the antenna system could be in the rear header of a vehicle. In some other embodiments, the antenna system could be located in any surface around the frame of the vehicle. In various embodiments, the antenna system could be located in any surface of a vehicle that is metal or can be metallized.

Alternatively, the reflector can be an interior surface of a non-vehicle object that has an antenna for receiving GNSS signals. Such antenna systems can be used in any object that configured to receive and/or transmit GNSS signals.

GNSS antenna systems may maintain connections with satellites that are orbiting in the zenith and upper atmosphere or higher. However, a terrestrial GNSS antenna can be occluded by snow or ice. Under such conditions, the GNSS antenna may not be functional, or performance may be significantly reduced. Removing snow and/or ice can be useful to autonomous operation of a vehicle, such as a summon operation, or any other suitable advanced driver assistance features of the vehicle.

Figure 7:
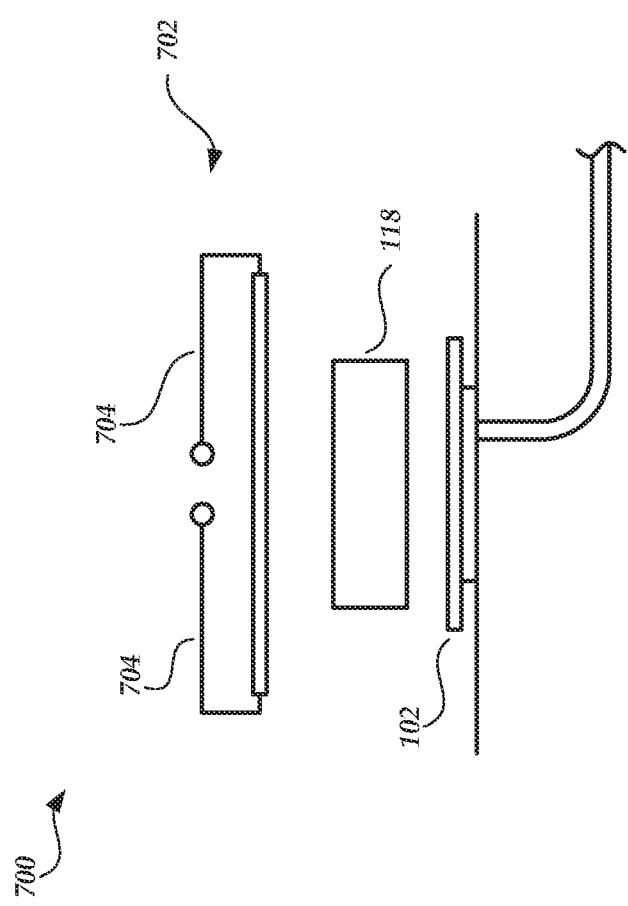
FIG. 7 depicts an illustrative antenna system and heating system according to one or more aspects of the present application.

FIG. 7 illustrates an embodiment of an antenna system 700 including a heating element 702. The heating element 702 can include a set of leads 704 that provide energy to the heating element 702. The heating element 702 can illustratively be a capacitively coupled metallic element positioned in a glass layer over the antenna component 102, such that the antenna component 102 can transmit and receive signals from the GNSS system. As illustrated in FIG. 7, a spacer 118 can separate the heating element 702 from the antenna component 102 in some embodiments. The heating element 702 can melt snow and/or ice accumulation over the glass area that covers the antenna. The heating element can also serve as a parasitic element to enhance antenna gain. By capacitively coupling the antenna and the heating element, thermally sensitive electronics can be thermally isolated from the heating element.

Figure 8A:
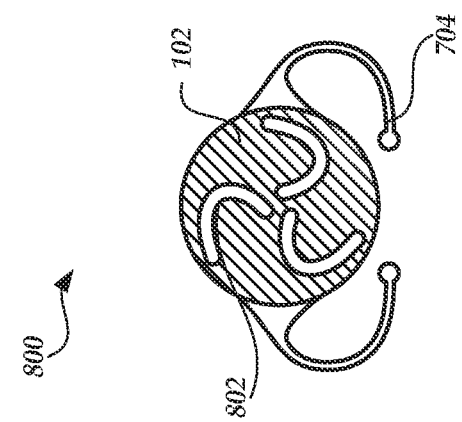
FIGS. 8A-8F depict an illustrative antenna system in combination with heating elements according to one or more aspects of the present application.

As illustrated in FIG. 7, the antenna system 700 can include a heating element 702, a spacer 118, and an antenna component 102. FIGS. 8A-8F_show several layers of an embodiment of the antenna system including a heating element. FIG. 8A shows an embodiment 800 of the heating element 802, which is embedded in the glass area over the antenna component 102. The heating element 802 can be patterned on glass, for example, using a conductive paste (e.g., a silver paste). The heating element 802 can be designed to replicate the pattern and/or design of the antenna and the antenna slots. The heating element 802 can be supplied with direct current (DC) or low frequency current to heat up, which in turn heats the glass above the antenna to melt the snow and/or ice accumulation. The heating element 802 can include one or more inductors 904 so the heating element 802 can be powered by direct current without interacting with radio frequency signals received by the antenna. The one or more inductors 904 can be patterned on glass. In some embodiments, the heating element can be covered to hide the traces from being viewed through the glass layer. As an example, a black ceramic frit can cover the heating element to hide traces of the heating element. The material covering the heating element 802 can be selected to have a minimal impact on thermal performance of the heating element.

Figure 8B:
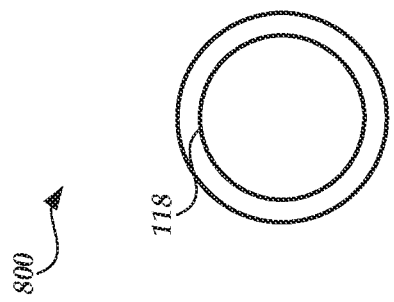
Figure 8C:
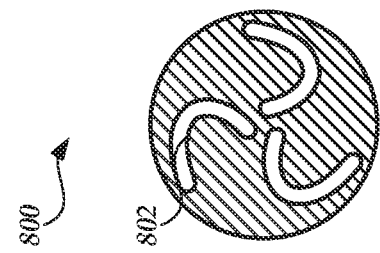
Figure 8F:
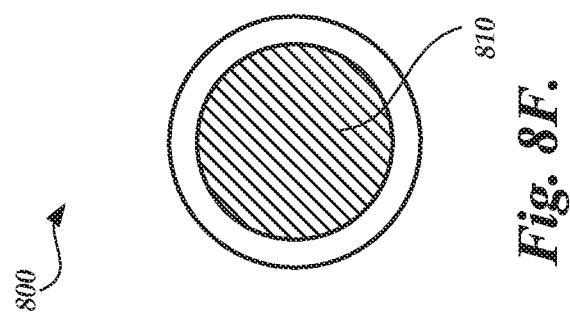
Figure 8E:
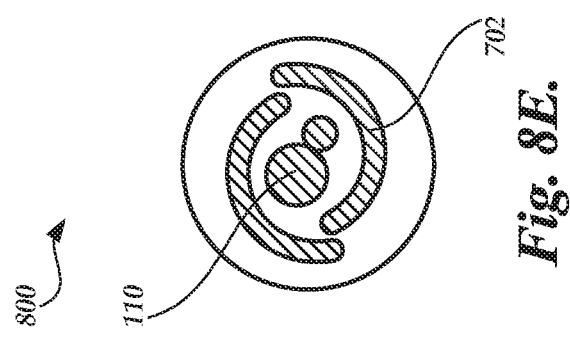
Figure 8D:
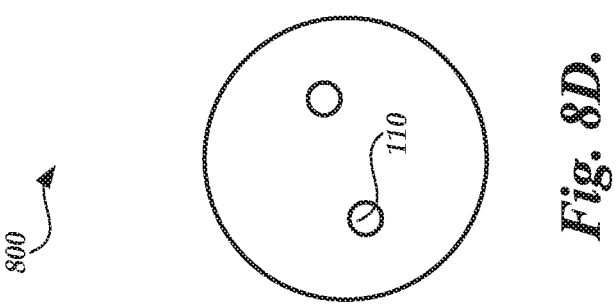

FIG. 8B corresponds to an embodiment in which a spacer 118 which separates the heating element 802 and the antenna component 102. Illustratively, the spacer 118 can correspond to any number of materials or lack of material, including, but not limited to air, a thermal sponge, or another material with a low thermal conductivity. The spacer can be flush mounted to the glass layer where the heating element is embedded. Illustratively, the spacer 118 can serve as a thermal barrier to ensure that heat from the heating element 702 (FIG. 7) is primarily used to heat the glass and melt the snow and/or ice accumulation. FIG. 8C shows an example an antenna component 102 located below the spacer 118. The antenna component 102 includes slots between conductive metal, such as copper. FIG. 8E illustrates an embodiment in which the antenna feeds shown. As shown in FIG. 8E, the antenna feeds can be included in the same layer as an LNA. FIG. 8E also illustrates a Fakra connection. A shielding structure 810 can be included in a layer below the antenna feeds and LNA, for example, as shown in FIG. 8F.

Figure 9:
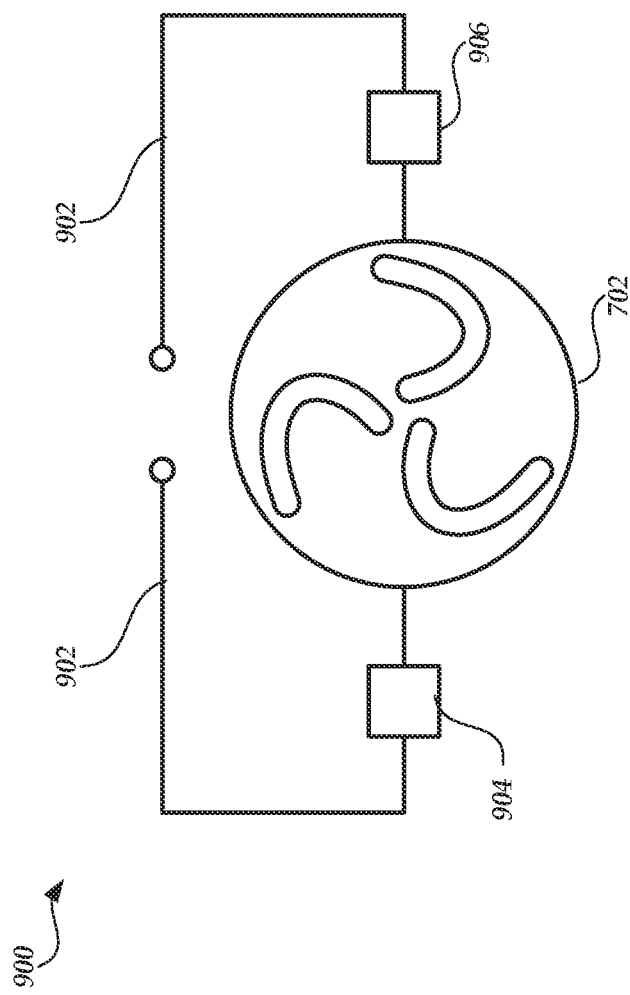
FIG. 9 depicts an illustrative antenna system and heating system according to one or more aspects of the present application.

FIG. 9 is a diagram 900 that illustrates that an upper antenna trace 902 can receive DC power via inductors 904, 906 to heat the antenna trace. Each of the illustrated inductors 904, 906 can be a lumped element or a pattered inductor.

The antenna system 900 including a heating element can be located on a vehicle. The antenna system including a heating element can be located on the vehicle under an area which can be wiped by wipers. In an embodiment, the wipers can be activated to wipe away the snow and/or ice that has been heated by the heating element of the antenna system. The heating together with wiping can remove snow and/or ice within about 200 seconds or less.

In certain embodiments, the heating element 1000 can have a heater grid pattern 1002 as illustrated in FIG. 10. As illustrated, the heater grid pattern 1002 can be made of a conductive material in the glass above the antenna which can be heated by having a current run through the heating element. The heater grid pattern 1002 is symmetric about a line bisecting the antenna component 102 and has a relatively wide opening over the antenna component as illustrated in FIG. 10. With such an opening, the antenna can be free from the heater grid pattern and the heater can have limited impact on the axial ratio of the antenna. Heater grid patterns with narrower openings and/or more overlap with the antenna can degrade axial ratio of the antenna more than the heater grid pattern shown in FIG. 10, FIG. 11 illustrates an embodiment of an integrated antenna system as described herein. Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

Although the disclosure and examples have been described with reference to the accompanying drawings, various changes and modifications will become apparent to those skilled in the art. Such changes and modifications are to be understood as being included within the scope of the disclosure. While certain embodiments have been described, these embodiments have been presented by way of example only, and are not intended to limit the scope of the disclosure. The illustrative discussions above are not intended to be exhaustive or to limit the inventions to the precise forms described. Many modifications and variations are possible in view of the above teachings. Others skilled in the art are thereby enabled to best utilize the techniques and various embodiments with various modifications as suited to various uses. Any suitable combination of the elements and/or features of the various embodiments described above can be combined to provide further embodiments.

What is claimed is:

1. An antenna system comprising:
a low noise amplifier;
a diplexer comprising a first input port, a second input port, and an output port connected to the low noise amplifier;
a multi-band antenna component configured to receive at least one signal, the multi-band antenna component comprising:
a plurality of slots in a printed circuit board configured to receive the at least one signal, wherein a first portion of individual slots of the plurality of slots extends radially outward from a center of the printed circuit board, wherein the first portion of the individual slots of the plurality of slots are configured radially equidistant from each other relative to the printed circuit board, wherein the plurality of slots comprises a second portion of the individual slots; and
two feeds comprising a first feed and a second feed, the first feed configured to connect the first portion with the first input port of the diplexer, and the second feed configured to connect the second portion with the second input port of the diplexer; and
a reflector configured to reflect signals in-phase with the at least one signal for reception by the multi-band antenna component.

2. The antenna system of claim 1, wherein the two feeds are configured to connect to the plurality of slots such that the at least one signal received by each of the two feeds is received in-phase from each slot of the plurality of slots such that the plurality of slots are configured as an array for receiving the at least one signal.

3. The antenna system of claim 1, wherein the plurality of slots is configured to receive global navigation satellite system signals.

4. The antenna system of claim 3, wherein the global navigation satellite system signals have frequency ranges of 1559 MHz to 1610 MHz, 1215 MHz to 1254 MHZ, and 1164 MHz to 1214 MHz.

5. The antenna system of claim 1, wherein the reflector is located relative to a rear surface of the multi-band antenna component in relation to a source of the at least one signal.

6. The antenna system of claim 5, wherein the reflector is a metal plate connected to the printed circuit board.

7. The antenna system of claim 5, wherein the reflector is a metallized surface.

8. The antenna system of claim 1, wherein the antenna system is configured to be integrated into a beauty cover in a rear-view mirror assembly of a vehicle.

9. The antenna system of claim 8, wherein the reflector is located between the printed circuit board and the beauty cover.

10. The antenna system of claim 1, wherein the reflector is configured to be in-plane with the multi-band antenna component.

11. The antenna system of claim 1, wherein the two feeds comprise a pair of spiral feeds.

12. The antenna system of claim 1, wherein the reflector is an artificial magnetic conductor ground plane.

13. The antenna system of claim 1, further comprising a heating element integrated into a surface between the multi-band antenna component and a source of the at least one signal, wherein the heating element is configured to heat a surface adjacent to the multi-band antenna component.

14. The antenna system of claim 13, wherein the heating element is a parasitic element configured to create a current.

15. The antenna system of claim 13, wherein the heating element comprises a metallic element capacitively coupled with the multi-band antenna component, the metallic element replicating a pattern of the plurality of slots.

16. The antenna system of claim 1, further comprising a filter configured to prevent signals from crossing between the two feeds.

17. An antenna system comprising:
a low noise amplifier;
a diplexer comprising a first port, a second port, and a third port connected to the low noise amplifier;
a multi-band antenna component configured to receive at least one signal, the multi-band antenna component comprising:
a plurality of slots in a printed circuit board configured to receive the at least one signal, wherein a first portion of individual slots of the plurality of slots extends radially outward from a center of the printed circuit board, wherein the first portion of the individual slots of the plurality of slots are configured radially equidistant from each other relative to the printed circuit board, wherein the plurality of slots further comprises a second portion of the individual slots; and two feeds comprising a first feed and a second feed, the first feed configured to connect the first portion with the first port of the diplexer, and the second feed configured to connect the second portion with the second port of the diplexer;

a reflector configured to reflect signals in-phase with the at least one signal for reception by the multi-band antenna component; and a heating element integrated into a surface between the multi-band antenna component and a source of the at least one signal, wherein the heating element is configured to heat a surface adjacent to the multi-band antenna component.

18. The antenna system of claim 17, wherein the reflector is configured to be in-plane with the multi-band antenna component.

19. The antenna system of claim 17, wherein the reflector is configured to be integrated into the printed circuit board.

20. The antenna system of claim 17, wherein the heating element comprises a metallic element capacitively coupled with the multi-band antenna component, and wherein the heating element configured to create a current via the capacitive coupling.

* * * * *